(12) United States Patent
Vohra et al.

(10) Patent No.: US 12,524,705 B2
(45) Date of Patent: Jan. 13, 2026

(54) INTELLIGENT UPGRADE WORKFLOW FOR A CONTAINER ORCHESTRATION SYSTEM

(71) Applicant: INTERNATIONAL BUSINESS MACHINES CORPORATION, Armonk, NY (US)

(72) Inventors: Shweta Vohra, Bangalore (IN); Madhusmita Patil, Hyderabad (IN); Atul Misra, Bangalore (IN); William A. Brown, Raleigh, NC (US); Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 18/065,395

(22) Filed: Dec. 13, 2022

(65) Prior Publication Data
US 2024/0193467 A1   Jun. 13, 2024

(51) Int. Cl.
*G06N 20/00* (2019.01)

(52) U.S. Cl.
CPC .................................. *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 7,000,228 B2 | 2/2006 | Mortazavi | |
| 8,959,503 B2 | 2/2015 | Teh et al. | |
| 10,684,895 B1* | 6/2020 | Goel | G06F 9/455 |
| 10,944,654 B2* | 3/2021 | Rimar | H04L 43/067 |
| 11,347,806 B2* | 5/2022 | Tal | G06F 16/178 |
| 11,785,365 B2* | 10/2023 | Alaettinoglu | H04L 47/225 398/25 |
| 11,868,812 B2* | 1/2024 | Ghergu | G06N 3/0442 |

(Continued)

FOREIGN PATENT DOCUMENTS

| | | |
|---|---|---|
| CN | 101465757 A | 6/2009 |
| WO | 2019068036 A1 | 4/2019 |
| WO | 2020097814 A1 | 5/2020 |

OTHER PUBLICATIONS

Kurt Mackie, How Microsoft Uses Machine Learning to Improve Windows 10 Upgrades, Sep. 27, 2019, 7 pages.

(Continued)

*Primary Examiner* — David E Choi
(74) *Attorney, Agent, or Firm* — CHIP LAW GROUP

(57) ABSTRACT

An approach is provided for upgrading containerized applications in cluster(s) in a container orchestration system. State information about the containerized applications is identified and analyzed. Based on the state information, an upgrade path for an upgrade of the containerized applications is determined. Using an artificial intelligence (AI) based container orchestration platform upgrade engine that employs continuous learning for upgrading data and algorithmic models to upgrade containers, a recommendation is generated that the upgrade be a full upgrade or a partial upgrade. A confirmation of the full upgrade or the partial upgrade is received from a user. Components for the full upgrade or the partial upgrade are created. Using the upgrade path and based on the full upgrade or the partial upgrade, the upgrade is performed.

20 Claims, 10 Drawing Sheets

(56) References Cited

U.S. PATENT DOCUMENTS

| | | | |
|---|---|---|---|
| 11,989,542 B2* | 5/2024 | O'Connor | G06F 8/61 |
| 12,198,148 B2* | 1/2025 | Knight | G06Q 10/04 |
| 2006/0130042 A1 | 6/2006 | Dias et al. | |
| 2013/0250813 A1* | 9/2013 | Janz | H04L 41/0809 370/255 |
| 2018/0285165 A1* | 10/2018 | Helsley | G06F 9/5077 |
| 2020/0153898 A1 | 5/2020 | Sabath | |
| 2021/0019196 A1* | 1/2021 | Geffin | G06F 9/5016 |
| 2021/0055947 A1 | 2/2021 | Mahajan | |
| 2021/0208961 A1* | 7/2021 | Dutta | G06F 11/0772 |
| 2021/0279111 A1 | 9/2021 | Ranjan | |
| 2022/0291913 A1* | 9/2022 | Antinori | G06F 8/65 |
| 2022/0292389 A1* | 9/2022 | Seabolt | G06N 20/00 |
| 2023/0123350 A1* | 4/2023 | Panikkar | G06F 9/505 718/105 |
| 2023/0169168 A1* | 6/2023 | Magen Medina | G06F 9/45558 726/23 |
| 2023/0385121 A1* | 11/2023 | Kumar | G06F 9/5072 |
| 2023/0409710 A1* | 12/2023 | Hen | G06F 21/562 |
| 2024/0022472 A1* | 1/2024 | Krishnamurthy | H04L 41/0894 |
| 2024/0036833 A1* | 2/2024 | Kerins | G06F 8/10 |
| 2024/0080241 A1* | 3/2024 | Pieczul | H04L 41/0886 |
| 2024/0143367 A1* | 5/2024 | Molteni | G06N 5/025 |
| 2024/0143368 A1* | 5/2024 | Molteni | G06F 9/45558 |
| 2024/0143369 A1* | 5/2024 | Molteni | G06F 9/45558 |
| 2024/0144048 A1* | 5/2024 | Molteni | G06N 5/025 |
| 2024/0193467 A1* | 6/2024 | Vohra | G06N 5/046 |
| 2024/0202017 A1* | 6/2024 | Kumar | G06F 9/45558 |
| 2024/0248739 A1* | 7/2024 | Ibrahim | G06F 9/5077 |
| 2025/0085992 A1* | 3/2025 | Xiao | G06F 9/44505 |
| 2025/0110775 A1* | 4/2025 | Janakiraman | G06F 9/4856 |

OTHER PUBLICATIONS

Retrieved from Internet on Nov. 22, 2022: https://github.com/kubernetes/kubernetes/blob/master/cluster/gce/upgrade.sh, 15 pages.
Upgrading kubeadm clusters, Retrieved from Internet: https://kubernetes.io/docs/tasks/administer-cluster/kubeadm/kubeadm-upgrade/, Last modified Jul. 29, 2022, 6 pages.
Kubernetes best practices: upgrading your clusters with zero downtime, Retrieved from Internet: https://cloud.google.com/blog/products/containers-kubernetes/kubernetes-best-practices-upgrading-your-clusters-with-zero-downtime, Jun. 1, 2018, 8 pages.
Retrieved from Internet on Nov. 22, 2022: https://github.com/kubernetes/kubernetes/blob/master/CHANGELOG/CHANGELOG-1.21.md#changes-by-kind-6, 151 pages.
Retrieved from Internet on Nov. 22, 2022: https://docs.newrelic.com/docs/infrastructure/host-integrations/installation/container-auto-discovery-host-integrations/, 9 pages.
Manually upgrading a cluster or node pool, Retrieved from Internet on Nov. 22, 2022: https://cloud.google.com/kubernetes-engine/docs/how-to/upgrading-a-cluster, Last updated Nov. 15, 2022, 16 pages.
Releases, Retrieved from Internet on Nov. 22, 2022: https://kubernetes.io/releases, last modified Aug. 13, 2022, 2 pages.

* cited by examiner

500 ↴

| Insight_ID | Existing State | Gaps | Best Practice / Insights / New Features Knowledge |
|---|---|---|---|
| ID_1 | Cluster API currently running app/v1<br><br>New API version in to be system app/v2 | PodDisruptionBudget not in use | PodDisruptionBudget API objects can now contain conditions in status |
| ID_2 | | Scheduling Features not in use | Rolling update and rollback feature |
| ID_3 | Application State | Deployment rolling upgrade feature | Not in use. Recommendation to use the feature |
| ID_4 | Application Configuration | Secrets in plain text | Secrets feature to be used with required algorithm enabled. Security risk. |

*FIG. 5*

```
600 ⤵ apiVersion: apps/v1  } 602
kind: Deployment
metadata:
  name: mongo
  labels:
    app.kubernetes.io/name: mongo
    app.kubernetes.io/component: backend  } 604
spec:
  selector:
    matchLabels:
      app.kubernetes.io/name: mongo
      app.kubernetes.io/component: backend  } 606
  replicas: 1
  template:
    metadata:
      labels:
        app.kubernetes.io/name: mongo
        app.kubernetes.io/component: backend
    spec:
      containers:
        name: mongo
        image: mongo:4.2  } 608
        args:
          - - - bind_ip
          - 0.0.0.0
        resources:
          requests:
            cpu: 100m
            memory: 100Mi  } 610
        ports:
          containerPort: 27017
```

| Configuration Parameter | As-is State (Captured from existing configuration file) | To-be State (Captured from a centralized repository) | Recommendation by the system / Cluster State Analyzer |
|---|---|---|---|
| clusterAPIVersion | 1.0 | 1.1 | ChangeNeeded: As clusterAPIVersion needs upgrade |
| applicationVersion | 1.0 | 1.0 | NoChange: as during upgrade, no changes are done to the application |
| Application component1 | ContainerID: 1<br>A. ContainerVersion: \<xxx\><br>B. Label: Database<br>C. Name: mongo<br>D. Version: 4.2<br>E. CPU:<br>F. Memory:<br><br>ContainerID: 2<br>A. ContainerVersion: \<xxx\><br>B. Label: Backendservice<br>C. Name: CustomCode<br>D. Version: 1<br>E. CPU:<br>F. Memory:<br>...<br>ContainerID: n<br>A. ContainerVersion: \<xxx\><br>B. Label: FrontEndservice<br>C. Name:UI<br>D. Version: 1.0<br>E. CPU:<br>F. Memory: | ContainerID: 1<br>A. ContainerVersion: \<yyy\><br>B. Label: Database<br>C. Name: mongo<br>D. Version: 4.2<br>E. CPU:<br>F. Memory:<br><br>ContainerID: 2<br>A. Container Version: \<xxx\><br>B. Label: Backendservice<br>C. Name: CustomCode<br>D. Version: 1<br>E. CPU:<br>F. Memory:<br>...<br>ContainerID: n<br>A. ContainerVersion: \<zzz\><br>B. Label: FrontEndservice<br>C. Name:UI<br>D. Version: 1.0<br>E. CPU:<br>F. Memory: | ChangeNeeded:<br>Details:<br>ContainerID: 1 (upgrade cluster configuration)<br><br>ContainerID: 2 (No change to cluster configuration)<br><br>ContainerID: 3 (upgrade cluster configuration)<br><br>...<br><br>ContainerID: n (upgrade cluster configuration) |

*FIG. 7*

| Component ID | Component Name | Application Component ID | Time taken to upgrade in minutes | Dependencies if any |
|---|---|---|---|---|
| 1 | System installations | | 45 | N/A |
| 1.1 | Static Pods | | 25 | N/A |
| 1.2 | Scheduler | | 15 | N/A |
| 1.3 | Controller | | 5 | N/A |
| 2 | Namespace1 | | 30 | |
| 2.1 | App1 Deployment Pods and configuration | A01 | 10 | A02 |
| 2.2 | App2 Deployment Pods and configuration | A02 | 5 | - |
| 2.3 | Services | | 10 | |
| 2.4 | Other configurations | | 5 | |
| 3 | Namespace2 | | 30 | |
| 3.1 | App1 Deployment Pods and configuration | A03 | | - |
| 3.2 | App2 Deployment Pods and configuration | A04 | | A05 |
| 3.3 | App3 Deployment Pods and configuration | A05 | | |
| 3.4 | Services | | 10 | |
| 3.5 | Other configurations | | 5 | |
| x | Namespace n | | 100 | |
| x.1 | App1 Deployment Pods and configuration | A0n-1 | 30 | A01 |
| x.2 | App2 Deployment Pods and configuration | A0n | 40 | - |

*FIG. 9*

INTELLIGENT UPGRADE WORKFLOW FOR A CONTAINER ORCHESTRATION SYSTEM

BACKGROUND

The present invention relates to maintaining container orchestration systems, and more particularly to upgrading an entirety of a container orchestration platform at the platform level which includes all hosted applications and implemented customizations.

A container orchestration system automates operations to run containerized workloads and services. The Kubernetes® platform is a portable, extensible, open source platform for container orchestration (i.e., for managing containerized workloads and services). Kubernetes is a registered trademark of The Linux Foundation located in San Francisco, California. A workload is an application running on the Kubernetes® platform and is run inside a set of pods. A pod represents a set of running containers on a cluster. A container is a lightweight and portable executable image that contains software and all of its dependencies. A cluster is a set of nodes (i.e., worker machines) that run containerized applications.

SUMMARY

In one embodiment, the present invention provides a computer system that includes one or more computer processors, one or more computer readable storage media, computer readable code stored collectively in the one or more computer readable storage media. The computer readable code includes data and instructions to cause the one or more computer processors to perform operations. The operations include identifying and analyzing state information about containerized applications in one or more clusters in a container orchestration system. The operations further include, based on the state information, determining an upgrade path for an upgrade of the containerized applications. The operations further include using an artificial intelligence (AI) based container orchestration platform upgrade engine that employs continuous learning for upgrading data and algorithmic models to upgrade containers, generating a recommendation that the upgrade of the containerized applications be a full upgrade or a partial upgrade. The operations further include receiving, from a user, a confirmation of the full upgrade or the partial upgrade. The operations further include creating components for the full upgrade or the partial upgrade. The operations further include using the upgrade path and based on the full upgrade or the partial upgrade, performing the upgrade of the containerized applications.

A computer program product and a method corresponding to the above-summarized computer system are also described and claimed herein.

BRIEF DESCRIPTION OF THE DRAWINGS

FIG. 5 is a table illustrating a sample gap analysis included in the process of FIG. 3, in accordance with embodiments of the present invention.

FIG. 6 is an example of obtaining containerized application topology, configuration, and connectivity included in the process of FIG. 3, in accordance with embodiments of the present invention.

FIG. 7 is a table illustrating state information and analysis of state information included in the process of FIG. 3, in accordance with embodiments of the present invention.

FIG. 9 is a table illustrating an example of an upgrade path determination included in the process of FIG. 3, in accordance with embodiments of the present invention.

DETAILED DESCRIPTION

Overview

Figure 1:
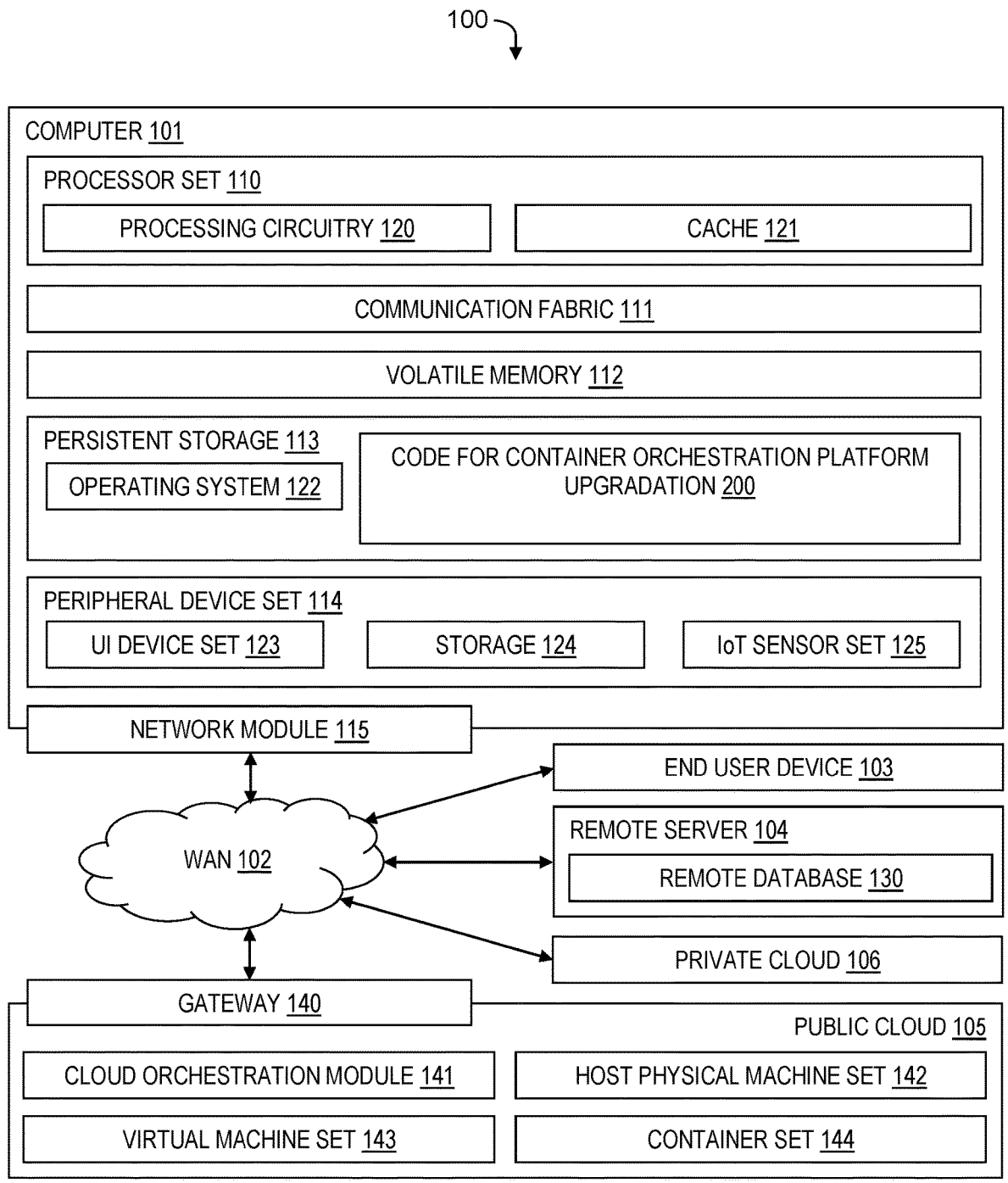
FIG. 1 is a block diagram of a system for upgrading containerized applications in one or more clusters in a container orchestration platform, in accordance with embodiments of the present invention.

Container orchestration platforms require quick upgrades due to, for example, quickly paced releases of different versions of platform contents. Releases for container orchestration systems such as native Kubernetes® happen at a fast pace due to open-source community contributions. At any point in time, Cloud Native Computing Foundation (CNCF) supports only the last three versions of the Kubernetes® platform. Because of the fast pace of releases and the limited CNCF support, an organization must upgrade every node in production at least once every quarter, irrespective of size and complexity of clusters. Such enforced upgrades of every node become especially challenging for large enterprises. Current techniques for these upgrades include a manual process in which a technical specialist follows a step-by-step approach to upgrade the previous cluster version stepwise through intermediate version(s) that are no longer supported. Any custom configuration completed for previous versions needs to be again applied manually in each step of the aforementioned step-by-step approach, thereby increasing risk and directly and negatively impacting effort and cost. The aforementioned problems with the current upgrade techniques are applicable to all container orchestration platforms and products, which impacts a wide range of container orchestration platform users and customers. The negative effects on effort, cost, and risk are exacerbated when an organization scales the upgrade technique at enterprise container orchestration platforms scattered across a hybrid cloud. Furthermore, existing solutions are limited by focusing on an upgrade of either an individual container or an application running in the container, without handling implemented customizations.

Embodiments of the present invention address the aforementioned unique challenges by providing an automated system that upgrades the overall container orchestration platform along with custom configurations. In one embodiment, an upgradation approach is provided to upgrade the container orchestration platform in a vendor-agnostic and commercial platform-agnostic manner. In one embodiment, an upgradation approach is provided to determine a system topology, which includes capturing an as-is state and a desired state of the container orchestration platform, along with upgrade-specific compatibility requirements.

In one embodiment, an upgradation approach is provided that (i) identifies underlying application dependencies based on information determined by an AI-based learning component and (ii) recommends suggested configuration options for a partial upgrade or a full upgrade of the container orchestration platform.

In one embodiment, an upgradation approach provides a continuous learning engine that supports an AI algorithm-based approach that calculates error probabilities while upgrading the individual configurations of the cluster. Furthermore, a centralized knowledge repository that is built using past learning behavior is used to automatically recognize and continuously scale and learn the upgradation that is needed. Embodiments use an AI-based approach to generate recommended steps to upgrade the container orchestration platform. Embodiments described herein store and analyze historical data that trains a learning component of the container orchestration system, which is used to enhance the determination of upgrade paths and upgrade recommendations in future upgradations. Embodiments capture and continuously improve the upgrade rules based on individual upgrade events. Embodiments provide knowledge graphs that capture the version topology, and which are used to optimize future upgradations.

Embodiments described herein include an approach that identifies the state and implemented versions of containerized applications and clusters, identifies potential application failure during upgradation due to dependency, incompatibility, and/or unavailability of a latest version of the container orchestration platform, detects customized configurations associated with the containerized applications and clusters, builds topologies of components of the container orchestration platform, and provides steps for automating the upgradation of the containerized applications and clusters.

Embodiments provide a system for determining an optimal sequence of application upgrades to perform the overall upgrade of the container orchestration platform in an optimal amount of time, with minimal dependencies, and with minimal errors, and further provide a system for a fully automated or partially automated upgradation based on the aforementioned optimal sequence. Embodiments of the present invention provide insights and analytics of the containerized applications and the container orchestration system.

In one embodiment, the system described herein enables effective, efficient, and transparent standardization with client-specific customizations. In one embodiment, a knowledge corpus is developed based on every new kind of implementation and lesson learned, iteratively. Embodiments described herein provide a comprehensive solution for upgrading an entire container orchestration platform that is error-free and challenge-free, and that decreases a need for subject matter expert (SME) skills. Furthermore, embodiments described herein promote a multi-cloud standardized platform implementation with limited or no human intervention. Still further, embodiments described herein enable developers to focus on the adopted new technology-based development instead of being concerned about the underlying platform.

Embodiments disclosed herein provide an approach for (i) automatic diagnosis of upgradation needed for a container orchestration platform at the platform level, considering all the applications hosted along with implemented customized configurations; and (ii) an AI-driven self-learning and evolving business rule driven upgrade mechanism with standardization. The approach is usable at hybrid cloud complexity level with multiple clusters utilizing multiple container orchestration systems. Using the approach described herein, large production clusters can be upgraded with minimal expertise.

It should be noted that container orchestration maintained by CNCF is used as an example herein, but embodiments of the present invention are not limited to CNCF-based examples.

In one or more embodiments, the intelligent upgrade workflow approach is applicable to all Kubernetes®-based container orchestration platforms such as the Google® Kubernetes® Engine (GKE®) environment, OpenShift® platform, Azure® Kubernetes® Engine (AKE) environment, and the Amazon® Elastic Kubernetes Service (EKS) environment. Google and GKE are registered trademarks of Google LLC located in Mountain View, California. OpenShift is a registered trademark of Red Hat, Inc. located in Raleigh, North Carolina. Azure is a registered trademark of Microsoft Corporation located in Redmond, Washington. Amazon is a registered trademark of Amazon Technologies, Inc. located in Seattle, Washington. The upgrade approach described herein can be adopted across the Kubernetes® ecosystem and is not a vendor-specific or a cloud provider-specific solution.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 200 for container orchestration platform upgradation. The aforementioned computer code is also referred to herein as computer readable code, computer readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

System and Process for Container Orchestration Platform Upgradation

Figure 2:
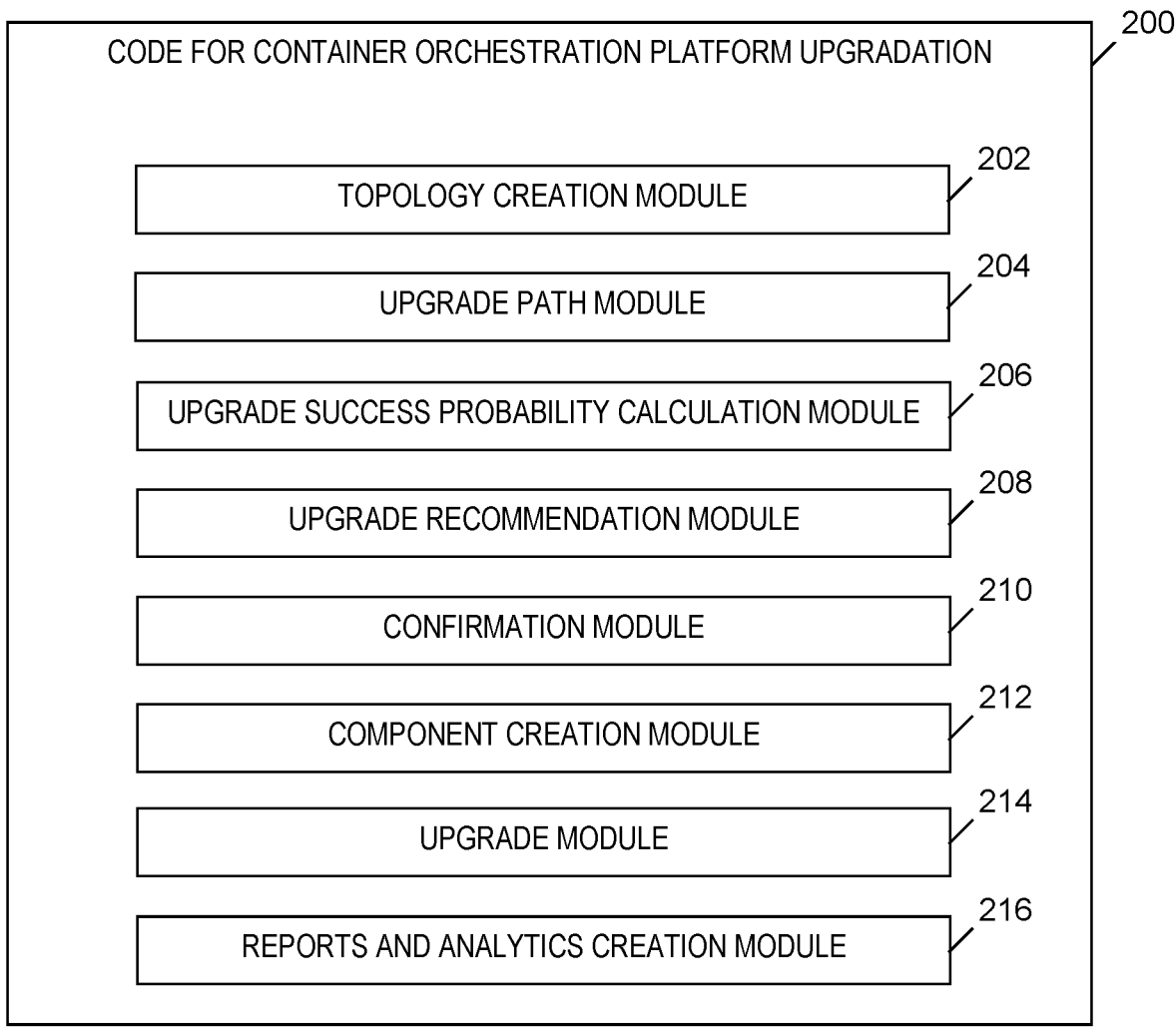
FIG. 2 is a block diagram of modules included in code included in the system of FIG. 1, in accordance with embodiments of the present invention.

FIG. 2 is a block diagram of modules included in code included in the system of FIG. 1, in accordance with embodiments of the present invention. Code 200 includes a topology creation module 202, an upgrade path module 204, an upgrade success probability calculation module 206, an upgrade recommendation module 208, a confirmation module 210, a component creation module 212, an upgrade module 214, and a reports and analytics creation module 216. The functionality of the modules included in code 200 is discussed in detail in the discussion of FIG. 3, which is presented below.

Figure 3:
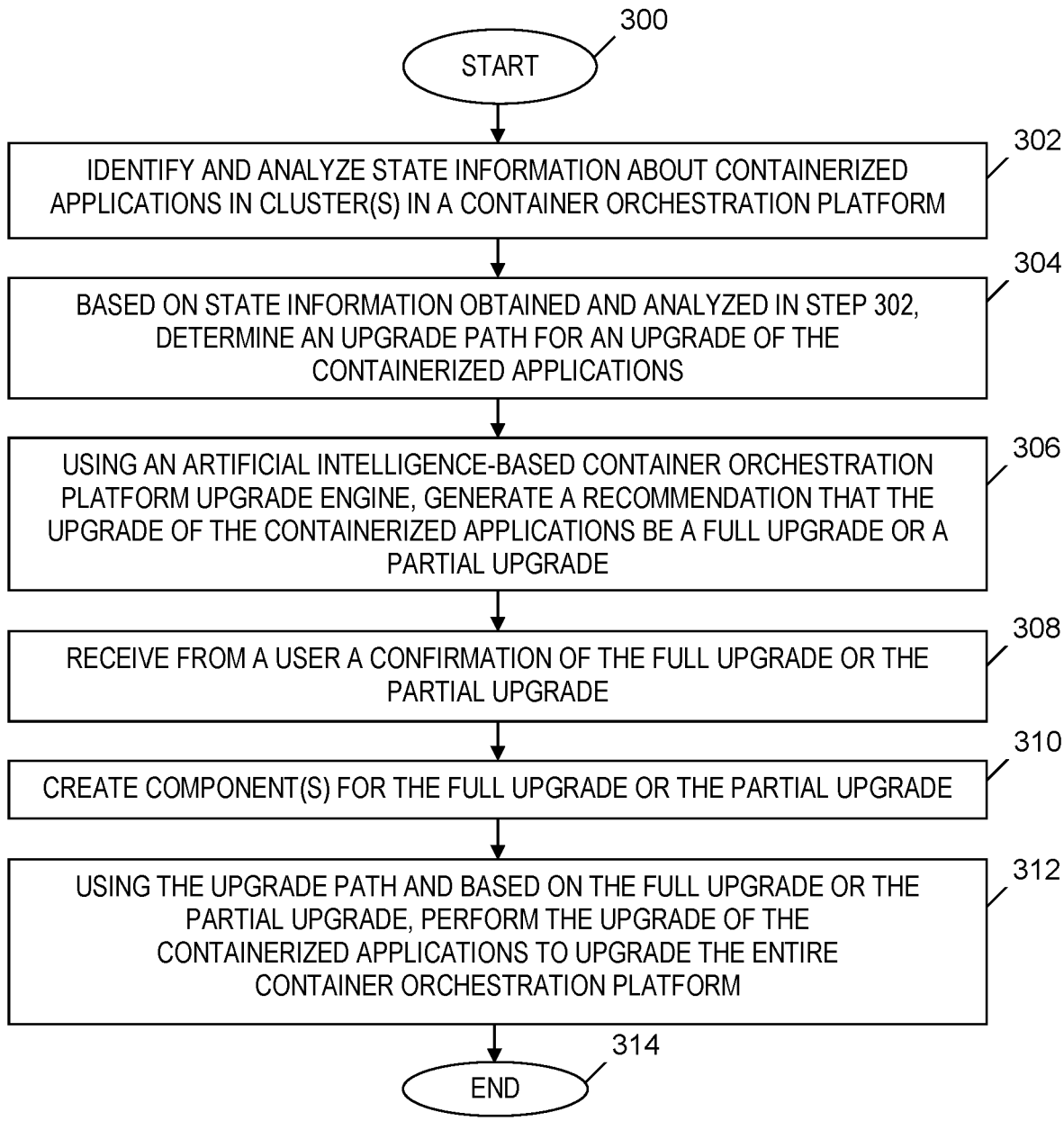
FIG. 3 is a flowchart of a process of upgrading containerized applications in one or more clusters in a container orchestration platform, where the operations of the flowchart are performed by the modules in FIG. 2, in accordance with embodiments of the present invention.

FIG. 3 is a flowchart of a process of upgrading containerized applications in one or more clusters in a container orchestration system, where the operations of the flowchart are performed by the modules in FIG. 2, in accordance with embodiments of the present invention. The process of FIG. 3 begins at a start node 300. In step 302, topology creation module 202 (see FIG. 2) identifies and analyzes state information about containerized applications in one or more clusters in a container orchestration system and builds a topology of components of the container orchestration platform which is being upgraded. The state information includes an existing state of containerized applications in the container orchestration platform, gaps in the existing state, and best practices associated with the identified gaps. The state information further includes a desired (i.e., to be) state of the containerized applications. In one embodiment, topology creation module 202 identifies and analyzes state information about an entirety of clusters and an entirety of containerized applications included in the clusters, where the clusters are included in a container orchestration platform. For example, step 302 includes topology creation module 202 identifying a first set of nodes within the clusters that are versions that are not up-to-date versions, and further identifying a second set of nodes within the clusters that include customized configurations.

In one embodiment, topology creation module 202 uses a scripting language or other programming language for data crawling to (i) obtain an existing state of a containerized application in the container orchestration platform, (ii) read application configurations that include customized configurations, and (iii) read containerized application topology.

In one embodiment, topology creation module 202 parses the state of the existing container orchestration platform and maps the parsed state against a live container orchestration repository (not shown), which automatically indicates whether an upgrade is needed, and further provides a capability to read the live container orchestration system without disturbing the running system or causing any downtime to critical container platforms running various applications. Using the results of the aforementioned parsing and mapping, topology creation module 202 segregates the extracted information into small logical chunks in a topology of information that is made ready for further analysis.

In step 304, based on the state information obtained and analyzed in step 302 and the topology built in step 302, upgrade path module 204 (see FIG. 2) determines steps needed for deciding an upgrade path for a full (i.e., automatic) upgrade or partial upgrade of the container orchestration platform.

In step 306, using an AI-based container orchestration platform upgrade engine, upgrade recommendation module 208 generates a recommendation that the upgrade of the containerized applications be a full upgrade or a partial upgrade. A full upgrade is a fully automated upgrade of the containerized applications. A partial upgrade is an upgrade of the containerized applications that is partly automated and partly done manually (i.e., by action(s) performed by one or more humans).

In step 308, confirmation module 210 (see FIG. 2) receives a confirmation from a user that the upgrade is to be completed as a full upgrade or as a partial upgrade.

In step 310, component creation module 212 (see FIG. 2) creates component(s) for the full upgrade or the partial upgrade, whose confirmation is received in step 308.

In step 312, using the upgrade path determined in step 304 and based on the full upgrade or the partial upgrade, whose confirmation is received in step 308, upgrade module 214 (see FIG. 2) performs the upgrade of the containerized applications.

Following step 312, the process of FIG. 3 ends at an end node 314.

Figure 4:
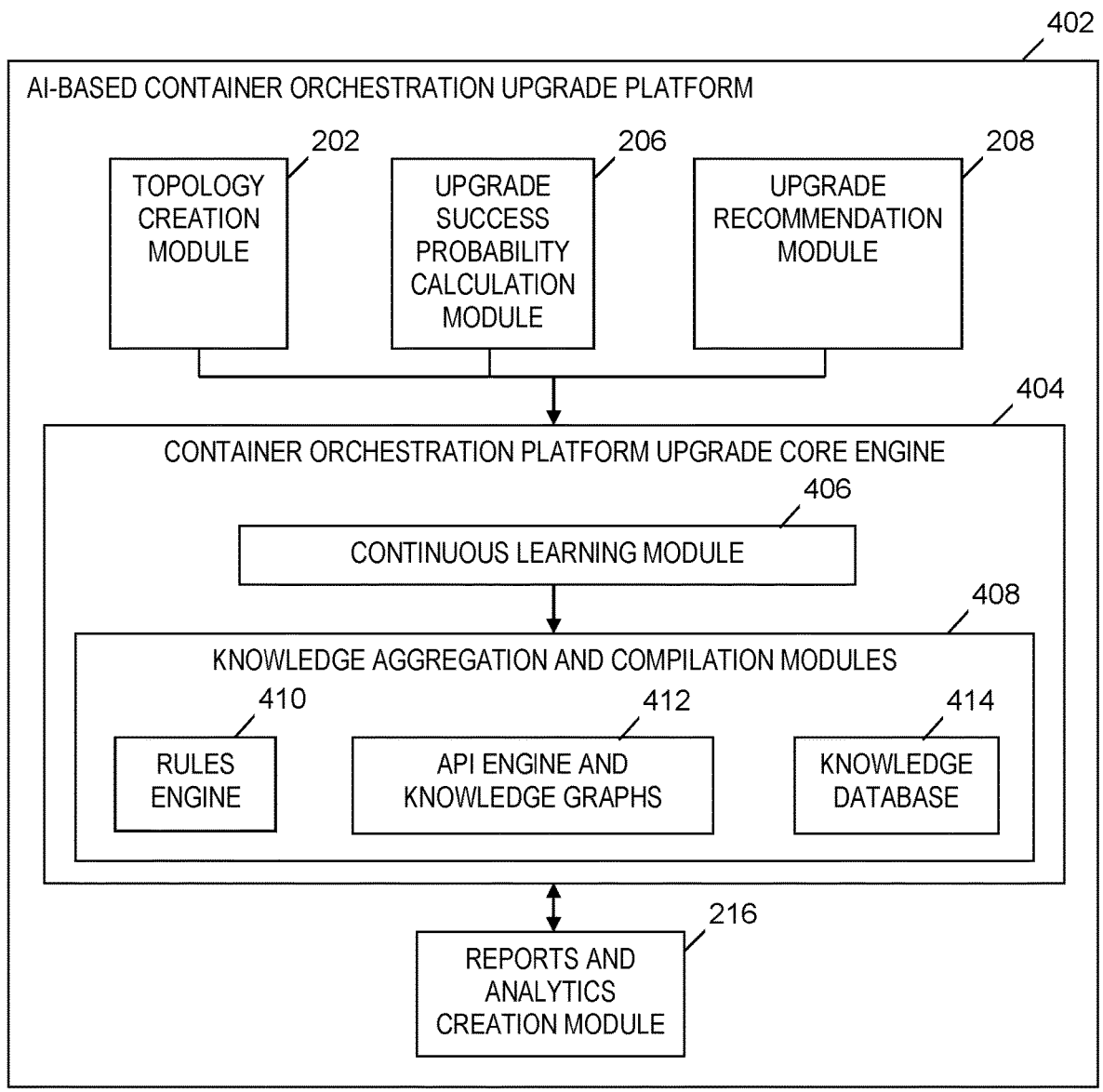
FIG. 4 is a block diagram of an AI based container orchestration upgrade platform which includes code included in the system of FIG. 1, in accordance with embodiments of the present invention.

FIG. 4 is a block diagram of an AI-based container orchestration upgrade platform 402 which includes code included in the system of FIG. 1, in accordance with embodiments of the present invention. AI-based container orchestration upgrade platform 402 includes topology creation module 202, upgrade success probability calculation module 206, upgrade recommendation module 208, a container orchestration platform upgrade core engine 404, and reports and analytics creation module 216.

Container orchestration platform upgrade core engine 404 includes a continuous learning module 406 and knowledge aggregation and compilation modules 408, which include a rules engine 410, Application Programming Interface (API) engine and knowledge graphs 412, and a knowledge database 414. In one embodiment, AI-based container orchestration upgrade platform 402 includes the code for container orchestration platform upgradation 200 (see FIG. 1 and FIG. 2). Container orchestration platform upgrade core engine 404 is also referred to herein as an AI-based container orchestration platform upgrade engine.

Topology creation module 202 creates a topology of the containerized applications in cluster(s) in the container orchestration system, identifies individual configurations, and determines the configuration(s) that are needed during upgradation of the containerized applications. Topology creation module 202 identifies gaps in the existing state of the containerized applications and confirms that the containerized applications need an upgrade.

Upgrade success probability calculation module 206 captures an overall probability of error during the upgradation of the containerized applications. Upgrade success probability calculation module 206 is implemented using AI. Based on historical data, upgrade success probability calculation module 206 calculates the probability of error for individual application configurations during the upgrade. Furthermore, upgrade success probability calculation module 206 recommends whether the partial upgrade or the full upgrade can be supported.

Upgrade recommendation module 208 recommends an upgrade path for performing the upgrade of the containerized applications. Upgrade recommendation module 208 is implemented using AI. Upgrade recommendation module 208 calculates the application dependencies of the containerized applications, so that the containerized applications are upgraded with minimal error and with fewer dependencies. For each application and based on historical data and potential errors, upgrade recommendation module 208 captures the duration and the dependent components and libraries, which minimizes the application dependency error.

Continuous learning module 406 parses and reads the changelog of newer release versions and composes a knowledge base as a knowledge corpus for to be version relevant topology, best practices, and new, deprecated changes. Continuous learning module 406 continuously learns and upgrades data and algorithmic models to upgrade a container orchestration system from a current state to a desired state. In one embodiment, continuous learning module 406 reads changelogs for all newer version knowledge extraction.

Rules engine 410 captures business rules that are applicable to the upgrade of the containerized applications. The capturing of the business rules may be manual based on administrator preference or imported from other enterprise-wide systems.

API engine and knowledge graphs 412 include methods to optimize and continuously construct knowledge utilization for all container orchestration platform knowledge extraction purposes, which derive and fetch information form knowledge database 414 (i.e., knowledge corpus database). In one embodiment, continuous learning module 406 persists gained knowledge from an upgradation of a container orchestration platform and uses information derived from the upgradation to update a rules library (not shown) and graphs in knowledge graphs 412.

Reports and analytics creation module 216 generates customized reports and insights for the user to further adapt to new version benefits and apply best practices per auditing and topology reports shared.

In one embodiment, during the building of the topology of the components of the container orchestration platform in step 302, reports and analytics creation module 216 generates an analysis of gaps in an existing state of clusters and containerized applications in a container orchestration platform, where the existing state is identified and analyzed in step 302. Reports and analytics creation module 216 persists the analysis of gaps in knowledge database 414. Table 500 in FIG. 5 indicates, for example, a scenario in which pods are highly used, but the PodDisruptionBudget feature is not in use. Reports and analytics creation module 216 captures the information in table 500 and stores the information in knowledge database 414, which subsequently provides the information as input for determining whether the upgrade of the feature specified in the Existing State column is a full (i.e., automatic) upgrade or a partial upgrade.

Identification of Current and Desired State and Recommendation of Upgrade Steps

FIG. 6 is an example 600 of obtaining containerized application topology, configuration, and connectivity included in the process of FIG. 3, in accordance with embodiments of the present invention. In step 302 (see FIG. 3), topology creation module 202 (see FIG. 4) analyzes and understands the state of containerized application topology, configurations, including application customizations, and connectivity. Again, topology creation module 202 parses the state of the existing container orchestration platform and maps the parsed state against the live container orchestration repository indicating a desired (i.e., to be) system. Topology creation module 202 converts and segregates the information from the parsed state into logical chunks of information and derives a topology for static and dynamic changes. For example, an existing configuration of an application deployment is mapped to a live version of the deployment API for changes in the cluster APIs or any other new or deprecated features. Example 600 is a sample application deployment in yaml format which indicates information that is collected by topology creation module 202. For example, topology creation module 202 obtains a specific version 602 to determine whether the sample application is subject to cluster API version changes that can happen from one version to subsequent versions. Topology creation module 202 obtains labels 604 indicating application connectivity. These labels are pod-specific or container-specific labels that are recorded and maintained to preserve application connectivity and smooth functioning after the upgrade. Topology creation module 202 also obtains selector labels 606, which indicate the sample application linking with the orchestration engine. External pods and containers connect with the sample application based on these selector labels specific to the container image. Topology creation module 202 also obtains a container image version 608, which includes customization information. Topology creation module 202 also obtains dynamic requirements 610, which include application configuration, and application memory and central processing unit (CPU) requirements. These requirements are specific and fine-tuned parameters specific to a pod over a period of time. The configuration values are the basis for determining the critical CPU and memory requirements of the container orchestration system after the upgrade.

In example 600, topology creation module 202 notes all the specific dependencies of the sample application and generates an application topology. After the collection of the application information noted above, topology creation module 202 identifies the state of the containerized application and the state of the cluster that includes the application. Topology creation module 202 determines a likelihood of application failures due to requirements in the upgraded system for (i) meeting new system requirements, such as CPU and memory limit requirements, (ii) persistent volume mappings, etc. These requirements need to be met for the application to run in the upgraded system based on the existing configuration file.

After determining the likelihood of application failures, topology creation module 202 performs a comprehensive analysis on the existing state of the cluster servers and worker nodes to determine application, infrastructure, and DevOps usage. Topology creation module 202 extracts information to perform a detailed audit of the system for best and worst practices in use by the current state of the cluster and container orchestrated modules. Topology creation module 202 checks for live version vs. old version validity (e.g., checks the last available versions on a product release). Topology creation module 202 generates insights based on the aforementioned audit and version validity check, which are used as input for other modules, such as the upgrade path module 204 (see FIG. 2) and upgrade recommendation module 208. FIG. 7 is a table 700 illustrating an example of the aforementioned version validity check and includes sample configuration parameters, as-is and to be state information, and recommendations by a cluster state analyzer (not shown). In one embodiment, the cluster state analyzer is included in topology creation module 202. Table 700 can be generated by using known programming languages.

Container Upgrade Using an Intelligent Workflow Approach

In one embodiment, the upgrade of the container orchestration platform using an intelligent workflow approach can be implemented using the following steps:

Step 1: Identify dependencies for the container orchestration platform based on the results generated by the cluster state analyzer, and the topology and analysis reports prepared by topology creation module 202 (see FIG. 2 and FIG. 4).

Step 2: For each of the cluster configurations, determine the upgrade needed by invoking upgrade recommendation module 208 (see FIG. 2) to check the steps needed for upgradation, which can be a complete automatic upgrade (i.e., full upgrade) or a partial upgrade, depending on the recommendation made by the container orchestration platform upgrade core engine 404 (see FIG. 4).

Step 3: Based on the output of the container orchestration platform upgrade core engine 404, confirmation module 210 (see FIG. 2) requests a human administrator to send a confirmation to proceed with the recommended upgradation. If the confirmation is received by confirmation module 210, then the upgradation is completed as described in Step 4; otherwise, reports and analytics creation module 216 (i) generates and sends a report to an administrator, where the report includes the recommendation; and (ii) exits the upgradation process.

Step 4: If proceeding with the upgrade, component creation module 212 (see FIG. 2) creates the necessary components for the upgrade. For example, if container orchestration platform upgrade core engine 404 responds with a model and upgrades knowledge database 414 (see FIG. 4) that supports solution creation for the customer. Subsequently, component creation module 212 creates a customized rules engine and solution framework required to implement the specific cluster servers and nodes without disturbing the state of the containerized applications running on the cluster.

Figure 8:
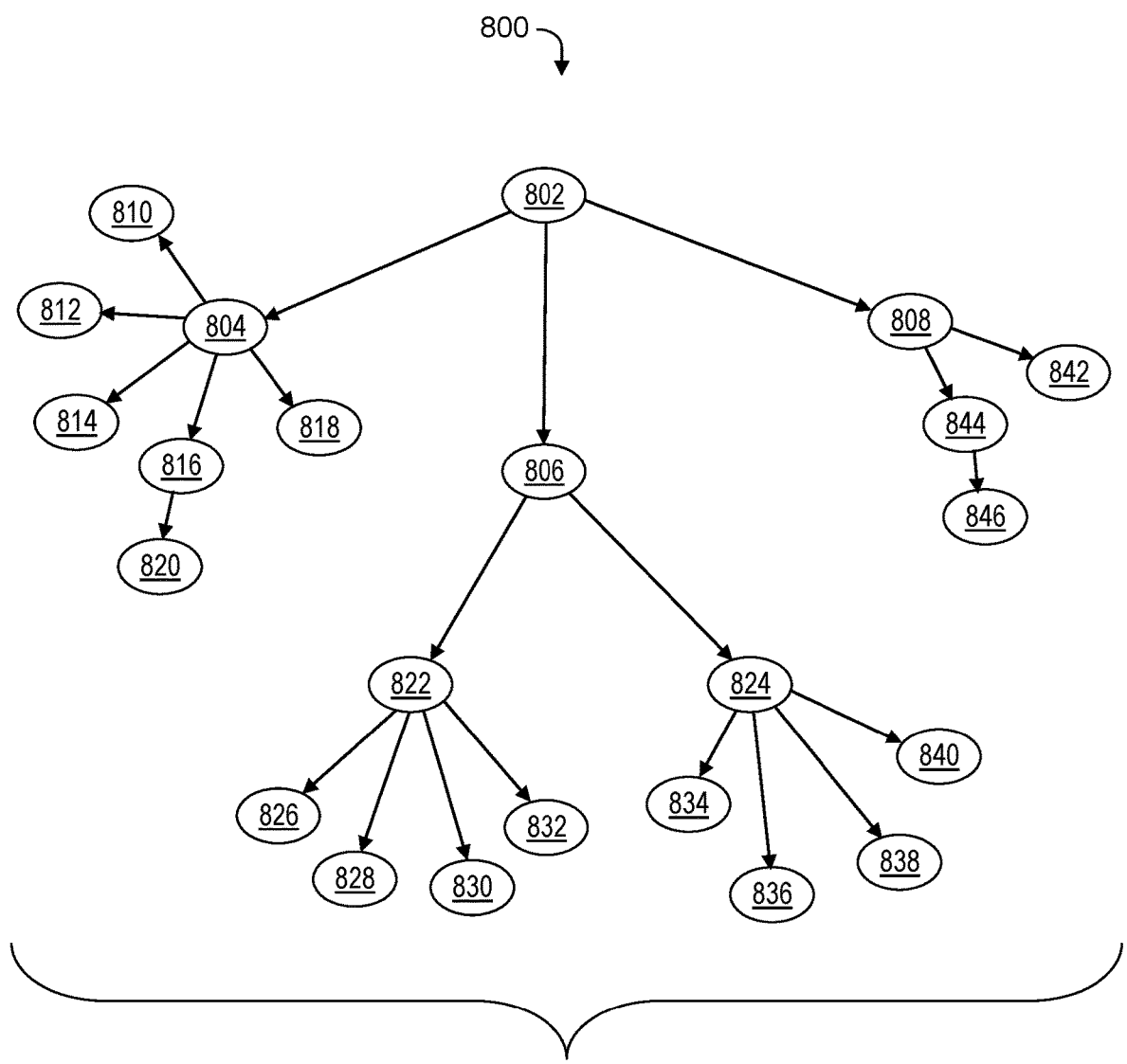
FIG. 8 is an example of a model used in determining an upgrade recommendation in the process of FIG. 3, in accordance with embodiments of the present invention.

FIG. 8 is an example of a model 800 (i.e., a tree) generated by container orchestration platform upgrade core engine 404, as described above. Model 800 includes a cluster version 802 (e.g., version v1.0) as a root node, which is linked System installations 804, Business applications 806, and Other installations 808. System installations 804 is linked to the next lower level nodes of Nodes 810, Machinesets 812, Daemonsets/static pods 814, Scheduler 816, and Controller 818. Custom scheduler 820 is a leaf node to Scheduler 816.

Business applications 806 is linked to the next lower level nodes of Namespaces 822 (i.e., Namespaces 1) and Namespaces 824 (i.e., Namespaces 2). Under Namespaces 822 are leaf nodes Apps 1 Deployment and Pods Configuration 826, Other configurations 828, Services 830, and Apps 2 Deployment and Pods Configuration 832.

Under Namespaces 824 are leaf nodes Apps 3 Deployment and Pods Configuration 834, Other configurations 836, Services 838, and Apps 4 Deployment and Pods Configuration 840.

Under Other installations 808 are the leaf node Third Party Tools/Operators 842 and Operators 844. Logging 846 is a leaf node linked to Operators 844.

FIG. 9 is a table 900 illustrating an example of an upgrade path determination included in the process of FIG. 3, in accordance with embodiments of the present invention. Table 900 includes columns for component identifier (ID), component name, application component ID, time taken to upgrade, and dependencies. Upgrade recommendation module 208 (see FIG. 2 and FIG. 4) computes a shortest path for the upgrade path that includes the containerized applications being upgraded. For the example in table 900, upgrade recommendation module 208 computes the shortest path based on the time taken values in table 900 and the dependencies in table 900. The shortest path computation may use, for example, a known shortest path calculation algorithm, such as Dijkstra's Shortest Path Algorithm or the Shorter Path Faster Algorithm (SPFA). Using Table 900, the shortest path for the upgrade path may be, for example, the following sequence of containerized applications: A02, A01, A03, A05, A04, A0n, A0n−1. Upgrade module 214 (see FIG. 2) uses the shortest path as the upgrade path after a user confirmation of the upgrade is received by confirmation module 210 (see FIG. 2).

Recommendation Approach

In one embodiment, container orchestration platform upgrade core engine 404 (see FIG. 4) is developed using an AI-based approach to continuously learn and upgrade data and algorithmic models to upgrade container orchestration platforms from a current state to a desired state. Container orchestration platform upgrade core engine 404 maintains the continuous learning to form a central repository for cluster upgrade information, logic, and database.

Container orchestration platform upgrade core engine 404 may include static features and dynamic features. The static features include, but are not limited to, application components, such as the number of pods and the deployment details for pods. The deployment details for pods may include replicas, exposed services, secrets, configuration maps, cluster-info, persistent volume (i.e., storage) policies, scheduling details (e.g., taints and tolerations), and networking configuration (e.g., load balancing, ingress, etc.). The dynamic features may include cluster API version upgrades, new and deprecated features, CPU utilization variations in new environments, memory utilization, persistent volume handles, logs data and configuration, and services and networking base changes.

For each feature configuration considered, upgrade success probability calculation module 206 (see FIG. 2 and FIG. 4) calculates an error probability based on the probability that the upgradation will fail at that feature level.

Some of the features, such as CPU utilization and memory utilization, have continuous random variables, whereas other features, such as persistent volume handles and cluster API version upgrades, have discrete random variables. Based on the analysis, the probability of error for discrete random variables during upgradation is usually zero, because those variables are not significantly impacted. The probability of error for the continuous random variables, however, may go up to one, depending on the associated observations and values.

After the error probability is calculated for all the variables, upgrade success probability calculation module 206 applies a binomial distribution function, calculating the probability of error during the upgrade, which indicates whether the upgrade will be a success or a failure.

The parameters of a binomial distribution are n and p, where n is the total number of trials and p is the probability of successful upgradation for the individual feature in each trial. The probability distribution function is:

$$f(k, n, p) = Pr(k; n, p) = \binom{n}{k} p^k (1-p)^{n-k},$$

$$\text{where } \binom{n}{k} = \frac{n!}{k!(n-k)!}$$

Sample code implementing the binomial distribution described above, with n=10 and p=0.8, is shown below:

```
from scipy.stats import binom
data_binom = binom.rvs(n=10,p=0.8,size=10000)
...
ax = sns.distplot(   data_binom,
                     kde=False,
                     color='skyblue',
                     hist_kws={"linewidth": 15,'alpha':1})
ax.set(xlabel='Binomial Distribution', ylabel='Frequency')
[Text(0,0.5,u'Frequency'), Text(0.5,0,u'Binomial Distribution')]
```

Figure 10:
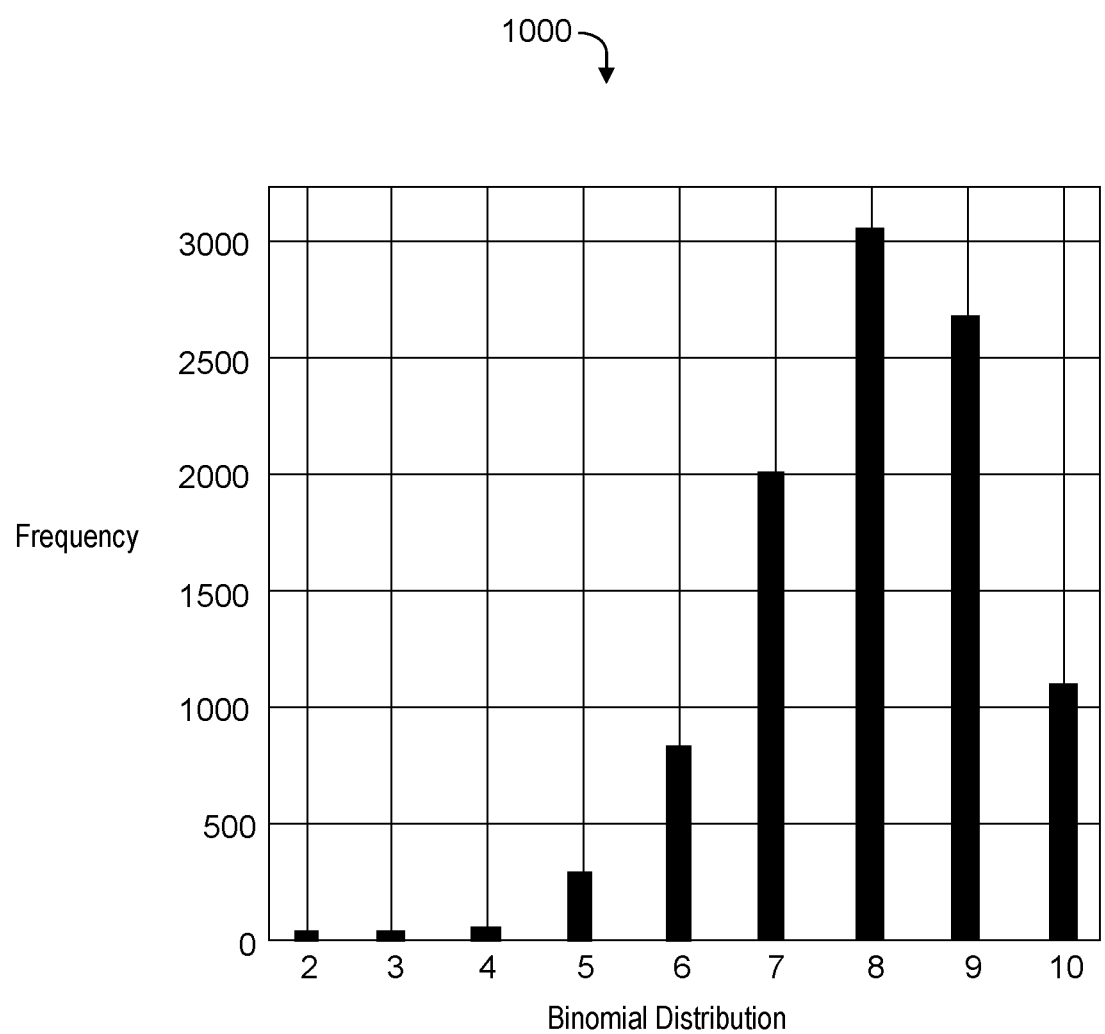
FIG. 10 is a sample graph illustrating a binomial distribution function applied to an error probability calculation in the process of FIG. 3, in accordance with embodiments of the present invention.

The sample code shown above provides a sample graph 1000 in FIG. 10. Sample graph 1000 illustrates a binomial distribution generated in the process of FIG. 3, in accordance with embodiments of the present invention. In the sample code and the sample graph 1000 for a given attribute, since the probability of success is greater than 0.5 (i.e., p=0.8), the distribution is skewed towards the right side of the graph, which indicates that the attribute can be upgraded successfully. In contrast, if the distribution in a similar graph is skewed toward the left side, then there may be errors indicating the upgrade of the attribute will fail.

After similar distributions are computed for each of the feature configurations, if all the configurations have a probability of success that is above 0.5 (or above a pre-defined threshold amount), then reports and analytics creation module 216 generates a report about the likelihood of a successful upgrade and upgrade recommendation module 208 generates a recommendation for a full upgrade (i.e., an automatic upgrade of the entire container orchestration platform, without a need for manual intervention); otherwise, upgrade recommendation module 208 generates a recommendation for a partial upgrade and captures the attributes that may have errors and need manual intervention to complete their upgrade.

The upgrade approach discussed above can be extended to the cluster level.

The descriptions of the various embodiments of the present invention have been presented herein for purposes of illustration but are not intended to be exhaustive or limited to the embodiments disclosed. Many modifications and variations will be apparent to those skilled in the art. Accordingly, the appended claims are intended to encompass all such modifications and variations as fall within the true spirit and scope of the embodiments described herein.

What is claimed is:

1. A computer system comprising:
one or more computer processors;
one or more computer readable storage media; and
computer readable code stored collectively in the one or more computer readable storage media, with the computer readable code including data and instructions to cause the one or more computer processors to perform at least the following operations:
identifying and analyzing state information about containerized applications in one or more clusters in a container orchestration system;
based on the state information, determining an upgrade path for an upgrade of the containerized applications;
using an artificial intelligence (AI) based container orchestration platform upgrade engine that employs continuous learning for upgrading data and algorithmic models to upgrade containers, generating a recommendation that the upgrade of the containerized applications be a full upgrade or a partial upgrade;
receiving from a user a confirmation of the full upgrade or the partial upgrade;
creating components for the full upgrade or the partial upgrade; and
using the upgrade path and based on the full upgrade or the partial upgrade, performing the upgrade of the containerized applications.

2. The computer system of claim 1, wherein the computer readable code further includes the data and the instructions to cause the one or more computer processors to perform the following further operations:
based on the upgrade of the containerized applications, continuously enriching a knowledge database and a rules engine; and
based on the enriched knowledge database and the rules engine, incorporating learning during an upgradation of other containers subsequent to the upgrade of the containerized applications.

3. The computer system of claim 1, wherein the computer readable code further includes the data and the instructions to cause the one or more computer processors to perform the following further operations:
identifying dependencies of the containerized applications based on a topology of the containerized applications; and
determining amounts of time required to upgrade respective components of the containerized applications,
wherein the determining the upgrade path for the upgrade of the containerized applications is based on the identified dependencies and the amounts of time required to upgrade the components.

4. The computer system of claim 1, wherein the generating the recommendation that the upgrade of the containerized applications be the full upgrade or the partial upgrade includes:
determining features of the container orchestration system, the features including static and dynamic features;
using a container orchestration platform upgrade core engine and for a given feature, determining error probabilities that the upgrade fails at a level of the features;
applying a binomial distribution function to the error probabilities; and
based on the applied binomial distribution function, determining a probability of success for the upgrade.

5. The computer system of claim 4, wherein the generating the recommendation that the upgrade of the containerized applications be the full upgrade or the partial upgrade further includes:
determining that the probability of success for the upgrade exceeds a threshold probability; and
based on the probability of success for the upgrade exceeding the threshold probability, generating a report about the probability of success for the upgrade and generating a recommendation for the full upgrade.

6. The computer system of claim 4, wherein the generating the recommendation that the upgrade of the containerized applications be the full upgrade or the partial upgrade further includes:
determining that the probability of success for the upgrade does not exceed a threshold probability; and
based on the probability of success for the upgrade not exceeding the threshold probability, generating a recommendation for the partial upgrade, which includes a recommendation for manual intervention for attributes of the upgrade having a likelihood of having errors.

7. The computer system of claim 1, wherein the identifying and analyzing the state information about the containerized applications in the container orchestration system includes:
automatically identifying an existing state of the containerized applications;
determining a custom configuration of the containerized applications and a topology of the containerized applications by reading a configuration of the containerized applications; and
parsing the identified existing state of the containerized applications and mapping the parsed identified existing state information against a live container orchestration repository,
wherein the determining the topology of the containerized applications includes extracting information from the configuration of the containerized applications and segregating the extracted information into logical chunks of information.

8. The computer system of claim 7, wherein the identifying and analyzing the state information about the containerized applications in the container orchestration system further includes:
based on the parsed identified existing state information being mapped against the live container orchestration repository, reading a live system without causing downtime to critical container platforms that are running applications in the container orchestration system.

9. A computer program product comprising:
one or more computer readable storage media having computer readable program code collectively stored on the one or more computer readable storage media, the computer readable program code being executed by one or more processors of a computer system to cause the computer system to perform at least the following operations:
identifying and analyzing state information about containerized applications in one or more clusters in a container orchestration system;
based on the state information, determining an upgrade path for an upgrade of the containerized applications;
using an artificial intelligence (AI) based container orchestration platform upgrade engine that employs continuous learning for upgrading data and algorithmic models to upgrade containers, generating a recommendation that the upgrade of the containerized applications be a full upgrade or a partial upgrade;
receiving from a user a confirmation of the full upgrade or the partial upgrade;
creating components for the full upgrade or the partial upgrade; and
using the upgrade path and based on the full upgrade or the partial upgrade, performing the upgrade of the containerized applications.

10. The computer program product of claim 9, wherein the computer readable program code is executed by the one or more processors to cause the computer system to perform the following further operations:
based on the upgrade of the containerized applications, continuously enriching a knowledge database and a rules engine; and
based on the enriched knowledge database and the rules engine, incorporating learning during an upgradation of other containers subsequent to the upgrade of the containerized applications.

11. The computer program product of claim 9, wherein the computer readable program code is executed by the one or more processors to cause the computer system to perform the following further operations:
identifying dependencies of the containerized applications based on a topology of the containerized applications; and
determining amounts of time required to upgrade respective components of the containerized applications,
wherein the determining the upgrade path for the upgrade of the containerized applications is based on the identified dependencies and the amounts of time required to upgrade the components.

12. The computer program product of claim 9, wherein the generating the recommendation that the upgrade of the containerized applications be the full upgrade or the partial upgrade includes:

determining features of the container orchestration system, the features including static and dynamic features;
using a container orchestration platform upgrade core engine and for a given feature, determining error probabilities that the upgrade fails at a level of the features;
applying a binomial distribution function to the error probabilities; and
based on the applied binomial distribution function, determining a probability of success for the upgrade.

13. The computer program product of claim 12, wherein the generating the recommendation that the upgrade of the containerized applications be the full upgrade or the partial upgrade further includes:
determining that the probability of success for the upgrade exceeds a threshold probability; and
based on the probability of success for the upgrade exceeding the threshold probability, generating a report about the probability of success for the upgrade and generating a recommendation for the full upgrade.

14. The computer program product of claim 12, wherein the generating the recommendation that the upgrade of the containerized applications be the full upgrade or the partial upgrade further includes:
determining that the probability of success for the upgrade does not exceed a threshold probability; and
based on the probability of success for the upgrade not exceeding the threshold probability, generating a recommendation for the partial upgrade, which includes a recommendation for manual intervention for attributes of the upgrade having a likelihood of having errors.

15. A computer-implemented method comprising:
identifying and analyzing, by one or more processors, state information about containerized applications in one or more clusters in a container orchestration system;
based on the state information, determining, by the one or more processors, an upgrade path for an upgrade of the containerized applications;
using an artificial intelligence (AI) based container orchestration platform upgrade engine that employs continuous learning for upgrading data and algorithmic models to upgrade containers, generating, by the one or more processors, a recommendation that the upgrade of the containerized applications be a full upgrade or a partial upgrade;
receiving, by the one or more processors, a confirmation from a user of the full upgrade or the partial upgrade;
creating, by the one or more processors, components for the full upgrade or the partial upgrade; and
using the upgrade path and based on the full upgrade or the partial upgrade, performing, by the one or more processors, the upgrade of the containerized applications.

16. The method of claim 15, further comprising:
based on the upgrade of the containerized applications, continuously enriching a knowledge database and a rules engine; and
based on the enriched knowledge database and the rules engine, incorporating learning during an upgradation of other containers subsequent to the upgrade of the containerized applications.

17. The method of claim 15, further comprising:
identifying dependencies of the containerized applications based on a topology of the containerized applications; and
determining amounts of time required to upgrade respective components of the containerized applications, wherein the determining the upgrade path for the upgrade of the containerized applications is based on the identified dependencies and the amounts of time required to upgrade the components.

18. The method of claim 15, wherein the generating the recommendation that the upgrade of the containerized applications be the full upgrade or the partial upgrade includes:
- determining features of the container orchestration system, the features including static and dynamic features;
- using a container orchestration platform upgrade core engine and for a given feature, determining error probabilities that the upgrade fails at a level of the features;
- applying a binomial distribution function to the error probabilities; and
- based on the applied binomial distribution function, determining a probability of success for the upgrade.

19. The method of claim 18, wherein the generating the recommendation that the upgrade of the containerized applications be the full upgrade or the partial upgrade further includes:
- determining that the probability of success for the upgrade exceeds a threshold probability; and
- based on the probability of success for the upgrade exceeding the threshold probability, generating a report about the probability of success for the upgrade and generating a recommendation for the full upgrade.

20. The method of claim 18, wherein the generating the recommendation that the upgrade of the containerized applications be the full upgrade or the partial upgrade further includes:
- determining that the probability of success for the upgrade does not exceed a threshold probability; and
- based on the probability of success for the upgrade not exceeding the threshold probability, generating a recommendation for the partial upgrade, which includes a recommendation for manual intervention for attributes of the upgrade having a likelihood of having errors.

* * * * *